(12) United States Patent
Zhang et al.

(10) Patent No.: US 8,462,613 B2
(45) Date of Patent: Jun. 11, 2013

(54) CHANNEL ESTIMATION FOR LONG TERM EVOLUTION (LTE) TERMINALS

(75) Inventors: Kai Zhang, Hong Kong (HK); Henry Ye, Hong Kong (HK); Cheng Wang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 350 days.

(21) Appl. No.: 12/964,734

(22) Filed: Dec. 9, 2010

(65) Prior Publication Data

US 2012/0147761 A1   Jun. 14, 2012

(51) Int. Cl.
*H04J 11/00* (2006.01)
*H03C 7/02* (2006.01)
*H03K 9/00* (2006.01)

(52) U.S. Cl.
USPC .............................. 370/208; 455/101; 375/316

(58) Field of Classification Search
USPC ................. 370/328–330, 203–210, 337, 344, 370/319, 321, 431, 468; 455/450, 451, 452, 455/58, 69, 101; 375/316, 324, 147
See application file for complete search history.

(56) References Cited

U.S. PATENT DOCUMENTS

| | | | |
|---|---|---|---|
| 7,474,611 B2 | 1/2009 | Svensson et al. | |
| 7,545,734 B2 | 6/2009 | Ma et al. | |
| 7,649,830 B2 * | 1/2010 | Jeon et al. | 370/203 |
| 2006/0203932 A1* | 9/2006 | Palanki et al. | 375/295 |
| 2008/0273583 A1 | 11/2008 | Song et al. | |
| 2009/0067518 A1 | 3/2009 | Melis et al. | |
| 2009/0180558 A1 | 7/2009 | Ma et al. | |
| 2009/0245090 A1 | 10/2009 | Budianu et al. | |
| 2009/0262844 A1* | 10/2009 | Honta | 375/260 |
| 2011/0075743 A1* | 3/2011 | Koike et al. | 375/259 |

OTHER PUBLICATIONS

Ye Li, "Pilot-Symbol-Aided Channel Estimation for OFDM in Wireless Systems", IEEE Transactions on Vehicular Technology, vol. 49, Issue 4, p. 1207-1215 (2000).
Zijian Tang, et al., "Pilot-Assisted Time-Varying Channel Estimation for OFDM Systems", IEEE Transactions on Signal Processing, vol. 55, Issue 5, p. 2226-2238 (2007).
Xiaodai Dong, et al., "Linear Interpolation in Pilot Symbol Assisted Channel Estimation for OFDM", IEEE Transactions on Wireless Communications, vol. 6, Issue 5, p. 1910-1920 (2007).
Peter Hoeher, et al., "Two-Dimensional Pilot-Symbol-Aided Channel Estimation by Wiener Filtering", IEEE International Conference on Acoustics, Speech, and Signal Processing, ICASSP-97., vol. 3, p. 1845-1848, (1997).

\* cited by examiner

*Primary Examiner* — Hanh N Nguyen
(74) *Attorney, Agent, or Firm* — Ella Cheong Hong Kong; Margaret A. Burke; Sam T. Yip (57) ABSTRACT

The present invention relates to a method of channel estimation comprising two major steps. The first step is the least-squared and minimum mean-square error (MMSE) estimations on the pilot resource elements to generate the channel response estimates at the predefined pilot locations. The second step of the channel estimation, which utilizes the results from the first step to compute the channel response estimates for the remaining resource elements, comprises the following three operations: (i) averaging of each pair of adjacent pilot resource elements in the frequency direction to obtain the channel response estimate of the resource element in the middle of those two pilot resource elements; (ii) MMSE interpolation in the time domain for all the sub-carriers containing pilot signals; and (iii) linear interpolation in the frequency direction for all the sub-carriers not containing any pilot signals.

8 Claims, 6 Drawing Sheets

CHANNEL ESTIMATION FOR LONG TERM EVOLUTION (LTE) TERMINALS

TECHNICAL FIELD

The present application relates generally to a method of channel estimation for a Long Term Evolution (LTE) terminal receiver. In particular, it relates to a method of channel estimation for an LTE terminal which combines least-squared (LS) estimation, minimum mean-square error (MMSE) interpolation, linear interpolation and averaging.

BACKGROUND

With the exponential growth of wireless communication, new techniques are needed to handle the high capacity of voice and data carried over wireless communication networks. The $3^{rd}$ Generation Partnership Project (3GPP) Long Term Evolution (LTE) (referred to as "LTE" hereinafter) is a promising network proposal to meet the challenge of increased traffic.

For LTE, the orthogonal frequency-division multiplexing (OFDM) modulation scheme is chosen for the transmission of the downlink signals between a transmitter, such as a base station, and a terminal/receiver, such as user equipment (UE) (e.g., mobile communication devices such as cell phones, etc.). Meanwhile, a special type of modulation method, which is termed single-carrier frequency-division multiple access (SC-FDMA), is used for the transmission of uplink signals.

Detailed information on LTE can be found in Rumney, *LTE and the Evolution of 4G Wireless*, John Wiley © 2009, and Sesia, *LTE: The UMTS Long Term Evolution*, Wiley © 2009, and the standard documents for E-UTRA: 3GPP TS 36.211: "Evolved Universal Terrestrial Radio Access (E-UTRA); Physical channels and modulation;" 3GPP TS 36.212: "Evolved Universal Terrestrial Radio Access (E-UTRA); Multiplexing and channel coding;"3GPP TS 36.213: "Evolved Universal Terrestrial Radio Access (E-UTRA); Physical layer procedures" the disclosures of which are incorporated by reference herein.

OFDM is a multi-carrier modulation scheme used in many digital communication systems. In OFDM, a large number of closely spaced orthogonal subcarriers are used to transmit data. The data are divided into several parallel data streams, one for each sub-carrier. Each sub-carrier is modulated with a conventional modulation scheme such as QAM, PSK, BPSK, or QPSK, at a low symbol rate while maintaining total data rate similar to single carrier modulation schemes in the same channel bandwidth. The baseband signal in an OFDM system is the sum of these modulated sub-carriers, which is then used to modulate a main RF signal. An important aspect of the demodulation of such a signal, and thereby retrieving the underlying baseband signal, involves processing it by a Fast Fourier Transform (FFT). The benefits of OFDM are high spectral efficiency, resiliency to radio-frequency (RF) interference and multi-path propagation.

In all communication systems, including LTE, variations in the phase and amplitude are introduced into the transmitted signals as they propagate along the channel. These variations are referred to as the channel response, and the channel response is usually frequency and time-dependent. If the receiver can determine the channel response, the received signal can be corrected to compensate for the channel degradation. The determination of the channel response is called channel estimation. In the currently defined LTE system (3GPP Release 8), a number of resource elements have been chosen to carry pilot signals (also known as "reference signals") for channel estimation purposes. The pilot signals contain known information that permits the channel estimator to determine the channel response on that carrier frequency at that particular instant in time by comparing the actually received signal with an expected signal, i.e. one that the receiver would have received under ideal channel conditions. The resource elements conveying the pilot signals are distributed in the time and frequency domains in a pilot signal pattern that is defined in the LTE standard (3GPP Release 8), and which permits the channel response of the resource elements not containing any pilot signal to be accurately estimated by interpolating the channel responses determined for the pilot signal-carrying resource elements (referred to as "pilot resource elements" hereinafter). Conventional interpolation methods include minimum mean-square error (MMSE) estimation, least-square (LS) estimation, linear interpolation and averaging.

The traditional methods of OFDM channel estimation can be divided into two major steps: the first step is an LS estimation that is carried out on the pilot resource elements, and the second step is an MMSE interpolation that is subsequently carried out on both the time and frequency domains to estimate the rest of the resource elements. These kinds of channel estimation methods which carry out MMSE interpolation on both the time and frequency domains are referred to as 2D MMSE channel estimation. The 2D MMSE estimation method exploits the channel correlation that is typically present along both the time axis and the frequency axis, and in general provides an acceptable level of performance in terms of frame error rate (FER). However, due to the wide signal carrier bandwidth and the use of multiple antennas, this type of channel estimation method is far too complex to be implemented on LTE systems and therefore less complex versions that provide performance close to that of a 2D MMSE estimation have been developed. Separable 2D MMSE estimation is an example of a commonly-used channel estimation method with lower complexity. In this method, an MMSE estimation is first performed in one dimension based on the channel correlation in that dimension and then an MMSE estimation is performed in another dimension which in turn exploits the correlation in that dimension.

Another way of simplifying the channel estimation process is by replacing MMSE interpolation with less complex algorithms, such as linear interpolation and averaging.

In general, linear interpolation is a mathematical operation for estimating values that lie between two known values or points. Given two known points A and B with Cartesian coordinates A=$(x_A, y_A)$ and B=$(x_B, y_B)$, the ordinate $y_P$ of an interpolated point with abscissa $x_p$ is calculated with the below formula for linear interpolation:

$$y_P = y_A + \frac{x_p - x_A}{x_B - x_A}(y_B - y_A) \tag{1}$$

In the context of channel estimation, x would denote the location of a resource element in the time or frequency domain, while y would denote the value of an estimated channel parameter. In the actual implementations of the linear interpolation method, simplified versions of equation (1) are sometimes derived in order to avoid the circuital complexity required to perform the calculations of equation (1).

Averaging in the context of channel estimation refers to the addition of the estimated channel parameters for two or more pilot resource elements, and subsequently dividing the sum total by the number of sampled pilot resource elements.

The simplification of the traditional OFDM channel estimation methods by means of linear interpolation and averaging has led to a reduction in hardware complexity, but concurrently the estimation performance is sacrificed.

Once the channel estimation is completed for the entire time-frequency grid within one downlink subframe, the receiver uses the channel estimate to determine, from the received data symbols, the original transmitted data signals. The receiver then performs symbol demapping, de-interleaving and decoding on the equalized data symbols in accordance with the coding and modulation schemes used for the transmitted data.

Channel estimation is one of the most critical parts in an OFDM system for obtaining good performance Accurate channel estimation in an OFDM signal receiver is crucial for the recovery of the transmitted information data at the receiver, so it is very important for the interpolation performance to be of sufficiently high quality. However, as illustrated in the previous paragraphs, there is usually a compromise between hardware complexity and the channel estimation performance. For the case of LTE, since the pilot signal pattern has already been defined in the standard, the channel estimation methods in the receiver must be designed to take full advantage of the available pilot signals embedded in the transmitted signal while taking into account the workload that will be imposed onto the computational hardware. Although there are existing channel estimation techniques that are able to provide an acceptable level of performance, a majority of these techniques are far too complex to be implemented on LTE user equipment in the near future.

Therefore, considering that the commercialization of the LTE system is already underway, there is now a strong need in the art for an improved method of channel estimation for LTE terminal receivers which combines good performance with low hardware complexity.

SUMMARY OF THE INVENTION

The present invention relates to an improved method of channel estimation for LTE terminal receivers. As with traditional methods of channel estimation, the whole estimation process can be divided into 2 major steps. The first step is to carry out least-square (LS) estimation and MMSE estimation on the pilot resource elements to calculate the channel response estimates at these predefined pilot locations. The second step can be subdivided into three individual operations: firstly, calculate in the frequency direction the average value of the channel estimates for each pair of adjacent pilot resource elements, and take that as the channel estimate for the resource element in the exact middle of those two adjacent estimated resource elements; secondly, an MMSE interpolation is carried out in the time domain on all the sub-carriers which contain pilot signals; and finally, linear interpolation is carried out in the frequency direction to generate channel response estimates for the sub-carriers which do not contain any pilot signals. When all these steps are completed, a channel estimate will have been calculated for each of the resource elements in a downlink subframe. Afterwards, channel equalization is carried out on the received signal, and the equalized signal will then be output on the LTE terminal.

DETAILED DESCRIPTION OF THE INVENTION

The present invention relates to an improved method of channel estimation for LTE terminal receivers, and it operates on the resource elements in a time-frequency grid. The length of said time-frequency grid in the time direction is equal to the number of data symbols in an OFDM downlink subframe as defined in the LTE standard (3GPP Release 8) while the length of said time-frequency grid in the frequency direction depends on the bandwidth allocation for the current OFDM signal. Compared to the existing methods of OFDM channel estimation, this invention offers a 70% reduction in the number of multiplication operations, and hence hardware complexity, while maintaining a similar level of performance in terms of frame error rate (FER).

In the prior art, 2D MMSE interpolation algorithms are carried out in the traditional OFDM channel estimation methods. These methods can offer a good level of channel estimation performance, however, when being implemented on an LTE terminal receiver, due to the wide bandwidth of the LTE signal carriers and the utilization of multiple antennas, these methods would become far too complex in view of the current technologies. Considering the complexity of the 2D MMSE methods, a number of simplified channel estimation methods, which replace the process of MMSE interpolation with linear interpolation and/or averaging, have been developed. These methods are able to provide a large reduction in hardware complexity, but at the expense of channel estimation performance.

The aim of the present invention is to provide a hybrid channel estimation method that offers good channel estimation performance with low hardware complexity by a combination of LS estimation, MMSE interpolation, linear interpolation and averaging. Moreover, this method is designed specifically for implementation on LTE systems.

Figure 1:
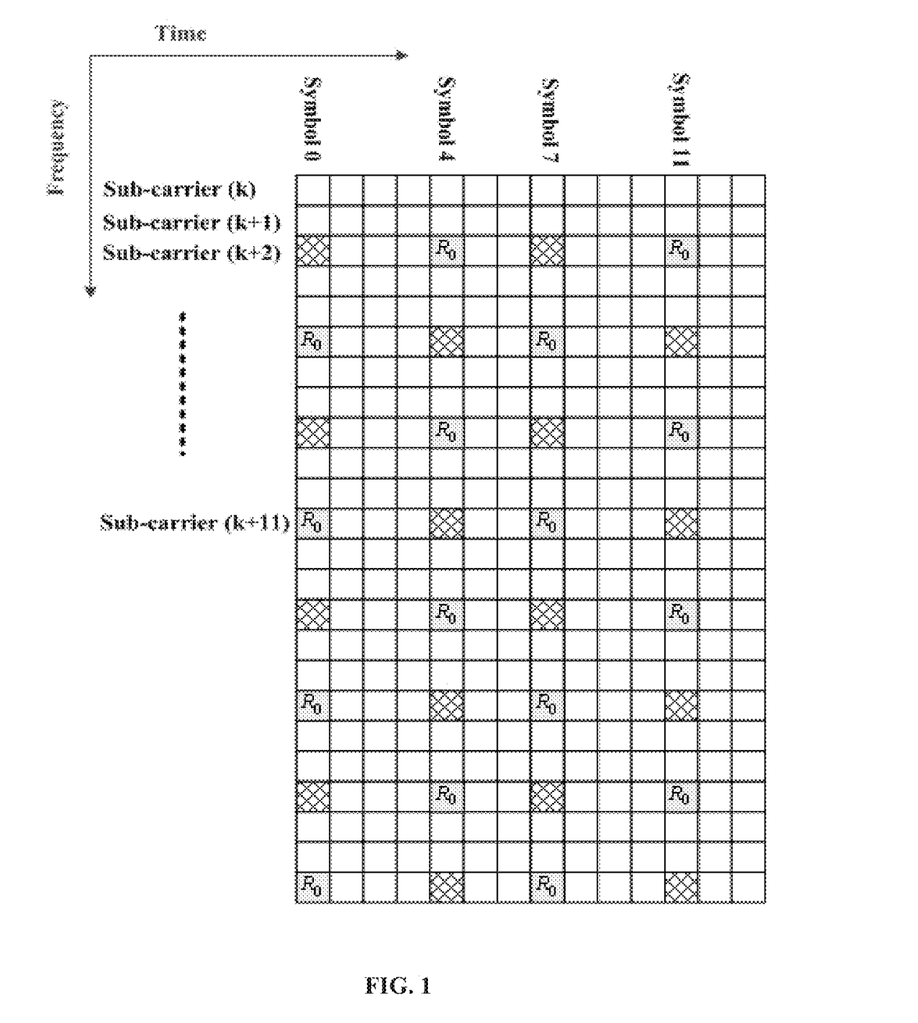
FIG. 1 depicts schematically the structure of an OFDM signal in one downlink subframe.
Figure 2:
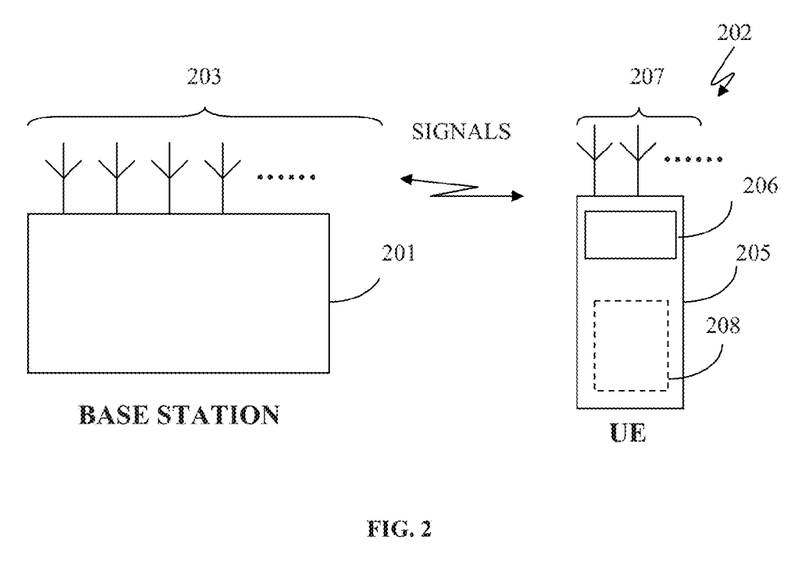
FIG. 2 depicts schematically a piece of user equipment for receiving a downlink OFDM signal from a base station.

A schematic representation of an LTE wireless communication system is depicted in FIG. 2. A base station 201 (also known as an eNodeB) sends and receives wireless communication signals via one or more antennae 203. User equipment 202 sends and receives wireless communication signals via one or more antennae 207 (pictured schematically on the upper surface of a handheld mobile device; however it is understood that such antennae are typically contained within the UE). User equipment 202 includes reception and transmission electronics and microprocessor 208 which, among other functions, performs channel estimation and other signal processing. Display 206 and associated audio and video processing electronics such as audio speakers and audio receivers are also included in the user equipment. While depicted as a handheld mobile device, it is understood that other electronic devices such as computers that include a wireless card and any other devices that can send and receive LTE wireless signals can be the user equipment in the present invention.

The present invention comprises the steps of: receiving an OFDM signal from a base station (also known as eNodeB), passing the received OFDM signal through an analogue-to-digital convertor (ADC), carrying out Fast Fourier Transform (FFT) on the converted OFDM signal, removing the cyclic prefix from the OFDM signal, performing the first step of the channel estimation on the pilot resource elements and subsequently performing the second step of the channel estimation on the rest of the resource elements on the frequency-time grid within one downlink subframe.

Figure 3:
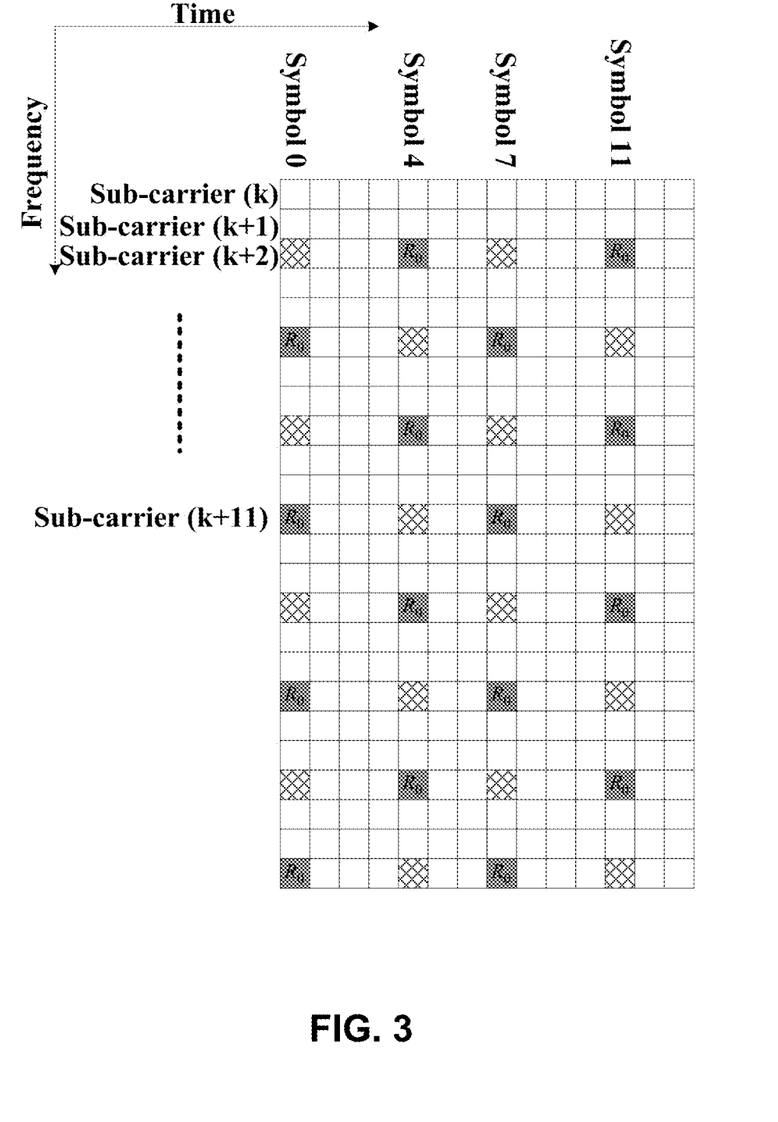
FIG. 3 depicts the first step of the channel estimation process.

The above-mentioned first step of the channel estimation is shown in FIG. 3, and it refers to performing an LS estimation and then an MMSE estimation on all the pilot resource elements. In the traditional channel estimation schemes, the first step of the estimation is usually just an LS estimation. However, the additional MMSE estimation included in the present invention can help provide a much better estimation than just using the LS method, especially in low signal-to-noise ratio (SNR) environments.

The detailed calculation steps for the LS estimation and the subsequent MMSE estimation are explained in the following paragraphs. Starting with the LS estimation, we first define the channel conditions to be estimated as $\overline{H}$, the pilot signals as matrix $\underline{X}$ or vector $\overline{X}$ and the received signals as $\overline{Y}$. $\overline{H}$ can be further defined as $\overline{H} = DFT_N(\overline{g}) = F\overline{g}$, where $\overline{H}$ is the LS estimator, $\overline{g}$ is the channel vector, and $DFT_N$ refers to the process of Discrete Fourier Transform (DFT), and it serves the purpose of converting the received signal from the time domain back to the frequency domain.

The aim of an LS estimation is to minimize the parameter $(\overline{Y} - \underline{X}\overline{H})^H (\overline{Y} - \underline{X}\overline{H})$ where $(\ )^H$ means the conjugate transpose operation. With LS estimation, the estimated value of $\overline{H}$ is given as below:

$$\hat{H}_{LS} = \underline{X}^{-1} \overline{Y} = [(X_k / Y_k)]^T \ (k = 0, \ldots, N-1) \quad (2)$$

Upon this basis, we can proceed to the calculations for an MMSE estimation. The aim of the MMSE estimation method is to employ the second-order statistics of the channel conditions to minimize the mean-square errors of the estimated signals. Further details concerning MMSE estimation are found in "Channel Estimation in OFDM Systems" by Yushi Shen and Ed Martinez, Freescale Semiconductor Application Note, c. 2006, pp. 1-16, the disclosure of which is incorporated by reference herein. At this point, we shall need to define a few more variables which will be used in our calculations: denote the autocovariance matrix of $\overline{g}$, $\overline{H}$ and $\overline{Y}$ by $R_{gg}$, $R_{HH}$ and $R_{YY}$ respectively; denote the cross covariance matrix between $\overline{g}$ and $\overline{Y}$ by $R_{gY}$; and denote the noise variance $E[|\overline{N}|^2]$ by $\sigma_N^2$. Assuming that the channel vector $\overline{g}$ and the noise $\overline{N}$ are uncorrelated, the following equations can be derived thereafter:

$$R_{HH} = E\{\overline{H}\overline{H}^H\} = E\{(F\overline{g})(F\overline{g})^H\} = FR_{gg}F^H \quad (3)$$

$$R_{gY} = E\{\overline{g}\overline{Y}^H\} = E\{\overline{g}(\underline{X}F\overline{g} + \overline{N})^H\} = R_{gg}F^H\underline{X}^H \quad (4)$$

$$R_{YY} = E\{\overline{Y}\overline{Y}^H\} = \underline{X}FR_{gg}F^H\underline{X}^H + \sigma_N^2 I_N \quad (5)$$

Assume that $R_{gg}$ (thus $R_{HH}$) and $\sigma_N^2$ are known at the receiver in advance, the MMSE estimator of $\overline{g}$ is given by $\hat{g}_{MMSE} = R_{gY} R_{YY}^{-1} \overline{Y}^{HH}$. Note that if $\overline{g}$ is not Gaussian, $\hat{g}_{MMSE}$ is not necessarily a minimum mean-square error estimator, but it is still the best linear estimator in the mean-square error sense. At last, it is calculated that:

$$\hat{H}_{MMSE} = F\hat{g}_{MMSE} \quad (6)$$

$$= E[(F^H \underline{X}^H)^{-1} R_{gg}^{-1} \sigma_N^2 + XF]^{-1} \overline{Y}$$

$$= FR_{gg}[(F^H \underline{X}^H \underline{X}F)^{-1} \sigma_N^2 + R_{gg}]F^{-1} \hat{H}_{LS}$$

$$= R_{HH}[R_{HH} + \sigma_N^2 (\underline{X}\underline{X}^H)^{-1}]^{-1} \hat{H}_{LS}$$

The purpose of the above LS and MMSE estimations is to compare the received signals at the predefined pilot locations with the expected signals. Any discrepancies between a received signal and the corresponding expected signal will be recorded as the channel response estimate at that time-frequency location.

Figure 4:
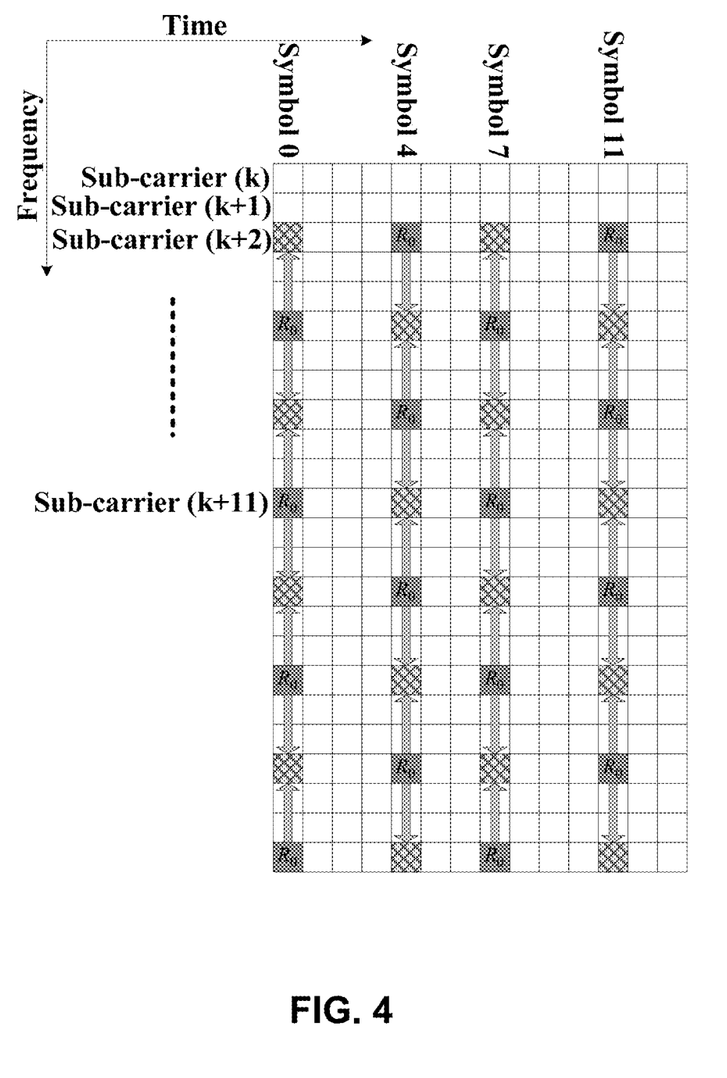
FIG. 4 depicts the averaging process in the frequency direction.
Figure 5:
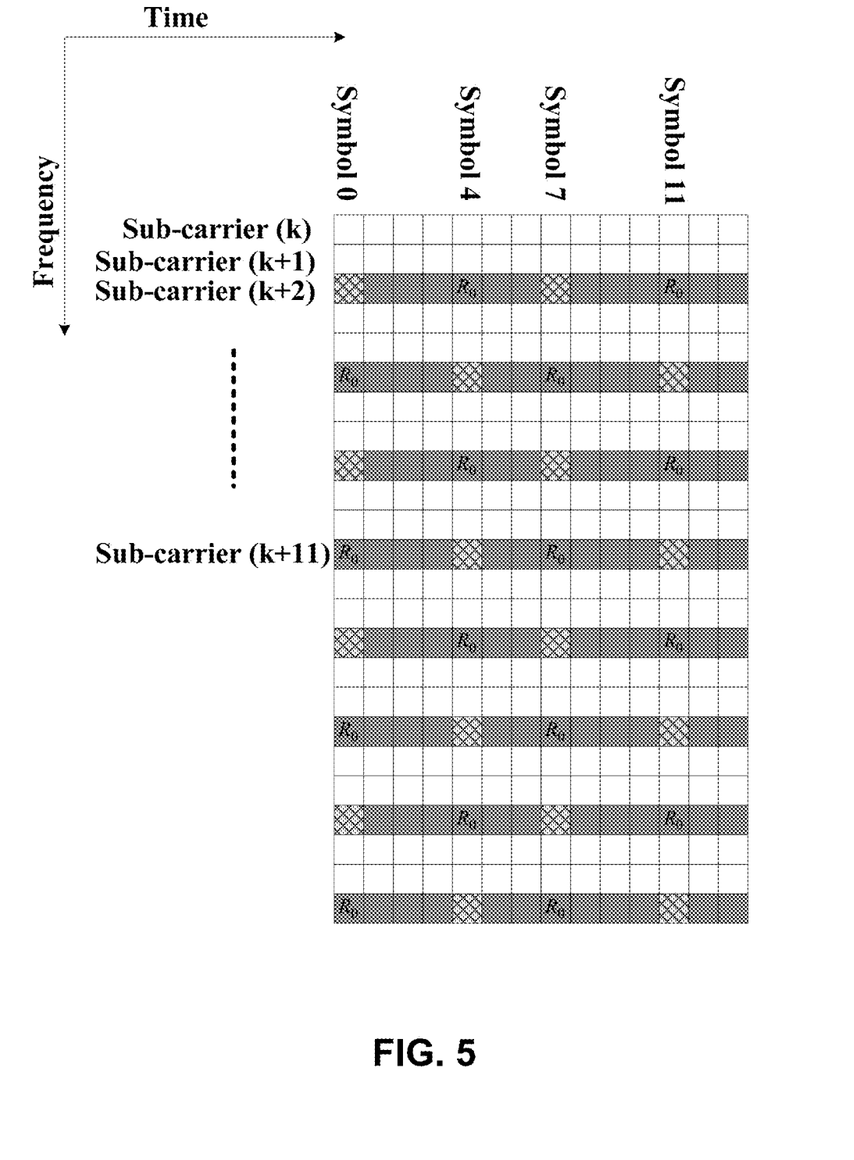
FIG. 5 depicts the MMSE interpolation in the time domain.

The second step of the channel estimation process, which involves utilizing the estimated pilot resource elements from the first step, can be subdivided into three individual operations: firstly, as illustrated in FIG. 4, the channel estimates for the resource elements in the exact middle of two adjacent pilot resource elements are calculated by simple averaging in the frequency direction, i.e. the estimated channel conditions obtained in step one for each pair of adjacent pilot resource elements are added together and divided by two to generate the estimates for the resource element in the exact middle of those two adjacent resource elements; secondly, as illustrated in FIG. 5, MMSE interpolation is carried out in the time domain on all the sub-carriers which contain pilot signals in order to calculate a channel estimate for each of the data symbols in these sub-carriers.

Figure 6:
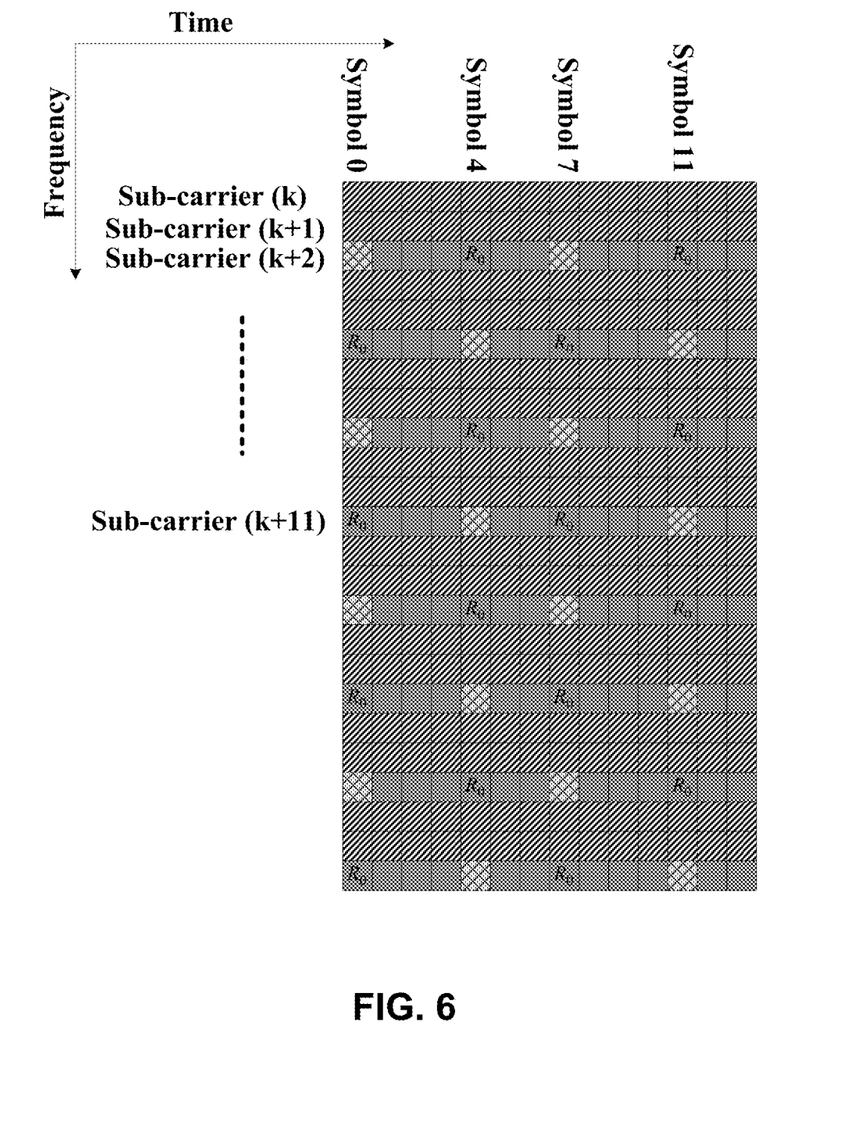
FIG. 6 depicts the linear interpolation in the frequency domain.

For the final operation of step 2 of the estimation process, as illustrated in FIG. 6, linear interpolation is carried out in the frequency domain on the sub-carriers which do not contain any pilot signals by utilizing the channel response estimates on the two adjacent estimated sub-carriers. For the linear interpolation process, the previously-mentioned equation (1):

$$y_p = y_A + \frac{x_p - x_A}{x_B - x_A}(y_B - y_A)$$

can be applied. Alternatively, other simplified or approximated forms of equation (1) may also be used. When equation (1) is used, $x_p$ would denote the location of the resource element while $y_p$ would denote the value of the estimated channel parameter. After the linear interpolation process, a channel response estimate would have been generated for each of the resource elements in one downlink subframe, and the process of channel estimation for this subframe is complete.

Subsequently, channel equalization is carried out on the estimated resource elements to restore the received OFDM signal to the state when it was being transmitted from the base station by offsetting the estimated channel responses embedded in the received signal. Said signal is then output on the LTE user terminal in the form of an audio signal, an image, a video or any combination of the above.

While the foregoing has been described in terms of the above embodiments, it is understood that various modifications and changes may be made. Such changes and modifications are within the scope of the invention as set forth in the following claims.

What is claimed is:

1. A method for receiver channel estimation in an LTE wireless communication system user equipment comprising:
   receiving a downlink OFDM signal from an LTE base station;
   performing a least-squared estimation and a minimum mean-square error (MMSE) estimation on pilot resource elements to generate channel response estimates at predefined pilot locations in the received signal;
   using the MMSE channel response estimates to compute further channel response estimates for remaining resource elements, comprising:

(i) averaging each pair of adjacent pilot resource elements in a frequency direction to obtain a channel response estimate of a resource element in the middle of the pair of pilot resource elements;

(ii) performing an MMSE interpolation in the time domain for all sub-carriers containing pilot signals; and (iii) performing linear interpolation in the frequency direction for all sub-carriers not containing any pilot signals.

2. A method for receiver channel estimation in an LTE wireless communication system user equipment according to claim 1 further comprising performing channel equalization on the estimated resource elements to restore the received OFDM signal to a state when it was being transmitted from the base station by offsetting the estimated channel responses embedded in the received signal.

3. A method for receiver channel estimation in an LTE wireless communication system user equipment according to claim 1 further comprising outputting the received OFDM signal on an LTE user terminal as an audio signal, an image, a video or a combination thereof.

4. A method for receiver channel estimation in an LTE wireless communication system user equipment according to claim 1 wherein a length of a time-frequency grid in the time direction is equal to the number of data symbols in an OFDM downlink subframe and a length of the time-frequency grid in the frequency direction is determined by a bandwidth allocation for the downlink OFDM signal.

5. User equipment for an LTE wireless communication system comprising:

one or more user equipment antennae;

user equipment configured to receive a OFDM wireless communications signal from a base station through the one or more user equipment antennae;

the user equipment including a microprocessor configured to perform a least-squared estimation and a minimum mean-square error (MMSE) estimation on pilot resource elements to generate channel response estimates at pre-defined pilot locations in the received signal such that the MMSE channel response estimates are used to compute further channel response estimates for remaining resource elements, by:

(i) averaging each pair of adjacent pilot resource elements in a frequency direction to obtain a channel response estimate of a resource element in the middle of the pair of pilot resource elements;

(ii) performing an MMSE interpolation in the time domain for all sub-carriers containing pilot signals; and (iii) performing linear interpolation in the frequency direction for all sub-carriers not containing any pilot signals.

6. User equipment for an LTE wireless communication system according to claim 5 wherein the microcontroller is further configured to perform channel equalization on the estimated resource elements to restore a received OFDM signal to a state when it was being transmitted from the base station by offsetting the estimated channel responses embedded in the received signal.

7. User equipment for an LTE wireless communication system according to claim 5 further comprising a display and an audio speaker for outputting the received OFDM signal as an audio signal, an image, a video or a combination thereof.

8. User equipment for an LTE wireless communication system according to claim 5 wherein the microcontroller is further configured to determine that a length of a time-frequency grid in the time direction is equal to the number of data symbols in an OFDM downlink subframe and a length of the time-frequency grid in the frequency direction is determined by a bandwidth allocation for the downlink OFDM signal.

* * * * *